United States Patent
Durand

Patent Number: 6,131,285
Date of Patent: Oct. 17, 2000

[54] PULTRUSION METHOD OF MANUFACTURING A COMPOSITE STRUCTURAL COMPONENT

[75] Inventor: Robert D. Durand, Wyomissing, Pa.

[73] Assignee: Dana Corporation, Toledo, Ohio

[21] Appl. No.: 09/001,314

[22] Filed: Dec. 31, 1997

[51] Int. Cl.[7] ................................. B21D 53/88
[52] U.S. Cl. ................... 29/897.2; 29/419.1; 156/180; 264/136
[58] Field of Search .............. 29/897.2, 419.1, 29/417; 156/160, 180; 264/136, 137; 280/785

[56] References Cited

U.S. PATENT DOCUMENTS

| | | | |
|---|---|---|---|
| Re. 29,593 | 3/1978 | Fuchs, Jr. ................ | 29/419.1 |
| 2,699,415 | 1/1955 | Nachtman ............... | 29/419.1 |
| 2,951,771 | 6/1960 | Butler ..................... | 29/419.1 |
| 2,953,849 | 9/1960 | Morgan ................... | 29/419.1 |
| 2,963,739 | 12/1960 | Whitehurst et al. . | |
| 3,095,642 | 7/1963 | Lockwood .............. | 29/419.1 |
| 3,127,668 | 4/1964 | Troy ........................ | 29/419.1 |
| 3,553,820 | 1/1971 | Sara . | |
| 3,608,183 | 9/1971 | Lemelson ............... | 29/419.1 |
| 3,683,485 | 8/1972 | Schierding et al. ..... | 29/419.1 |
| 3,760,488 | 9/1973 | Cucuz et al. ............ | 29/557 |
| 3,793,700 | 2/1974 | Maikish et al. ......... | 29/419.1 |
| 3,798,093 | 3/1974 | Levine et al. ........... | 29/419.1 |
| 3,918,141 | 11/1975 | Pepper et al. ........... | 29/419.1 |
| 4,082,864 | 4/1978 | Kendall et al. . | |
| 4,207,667 | 6/1980 | D'Angelo et al. ....... | 29/417 |
| 4,285,749 | 8/1981 | Stiles ....................... | 156/180 |
| 4,515,866 | 5/1985 | Okamoto et al. . | |
| 4,831,707 | 5/1989 | Goddard et al. ........ | 29/419.1 |
| 5,024,902 | 6/1991 | Suganuma et al. . | |
| 5,110,190 | 5/1992 | Johnson . | |
| 5,201,117 | 4/1993 | Wright .................... | 29/417 |
| 5,273,099 | 12/1993 | Takagi et al. . | |
| 5,540,797 | 7/1996 | Wilson . | |
| 5,882,460 | 3/1999 | Durand et al. .......... | 156/180 |

FOREIGN PATENT DOCUMENTS

| | | | |
|---|---|---|---|
| 58-12755 | 1/1983 | Japan ..................... | 29/897.2 |
| 81/02128 | 8/1981 | WIPO .................... | 29/419.1 |

OTHER PUBLICATIONS

H. J. Wagner, Fiber–Reinforced Metals, Review of Recent Developments, Jun. 24, 1966.

*Primary Examiner*—Irene Cuda
*Assistant Examiner*—Trinh Nguyen
*Attorney, Agent, or Firm*—MacMillan, Sobanski & Todd, LLC

[57] ABSTRACT

A method of manufacturing a composite structural component for a vehicle. A plurality of fibers are pre-treated with a wetting agent. The pre-treated fibers are pulled through a supply of molten metal to coat the fibers. The wetting agent facilitates the adhesion of the molten metal to the fibers. The metal-coated fibers are pulled through a shaping die to form an elongated structure having a desired shape, and cooled to solidify the elongated structure. The elongated structure is cut to a desired length to form a composite structural component for a vehicle.

20 Claims, 1 Drawing Sheet

PULTRUSION METHOD OF MANUFACTURING A COMPOSITE STRUCTURAL COMPONENT

BACKGROUND OF THE INVENTION

This invention relates in general to methods of manufacturing composite structural components and in particular to a pultrusion method of manufacturing a composite structural component for a vehicle.

Most land vehicles in common use, such as trucks, vans and automobiles, include a body and frame assembly which is supported on a plurality of ground-engaging wheels by a resilient suspension system. The structures of body and frame assemblies can be divided into two general categories, namely separate and unitized. In a typical separate body and frame assembly, the structural components of the vehicle body and the vehicle frame assembly are separate and independent from one another. When assembled, the vehicle frame assembly is resiliently supported on the vehicle wheels by the suspension system and serves as a platform on which the vehicle body and other components of the vehicle can be mounted. Separate body and frame assemblies of this general type are found in most older vehicles, but remain in common use today for many relatively large or specialized modern vehicles, such as trucks, large vans and sport utility vehicles. In a typical unitized body and frame assembly, the structural components of the vehicle body and the vehicle frame assembly are combined into an integral unit which is resiliently supported on the vehicle wheels by the suspension system. Unitized body and frame assemblies of this general type are found in many relatively small modern vehicles, such as automobiles and minivans.

In both types of body and frame assemblies, the vehicle frame assembly usually includes a pair of elongated, parallel side rails, and a plurality of cross members extending between the side rails to connect them together. In the past, these structural components of the vehicle frame assembly have usually been formed of steel. Vehicle frame components formed of steel provide desirable strength and stiffness to the vehicle frame assembly. However, the steel vehicle frame components are relatively heavy and, therefore, undesirably add to the weight of the vehicle. It is known to form some kinds of vehicle components from fiber-reinforced synthetic resins. The fiber-reinforced resins are significantly lighter than steel, but they generally do not have sufficient strength for use as vehicle frame components in heavy vehicles. Accordingly, it would be advantageous to provide a method of manufacturing a lightweight vehicle frame component having excellent strength and stiffness.

SUMMARY OF THE INVENTION

This invention relates to a method of manufacturing a composite structural component for a vehicle, and in particular to a method of manufacturing a composite vehicle frame component. To provide a lightweight vehicle frame component having excellent strength and stiffness, this invention contemplates forming the vehicle frame component from a lightweight metal such as aluminum or magnesium, and reinforcing the metal with a plurality of continuous high-strength fibers such as carbon fibers or glass fibers. A difficulty with this method is that molten aluminum or magnesium does not readily adhere to the reinforcing fibers. If the metal does not adequately adhere to the fibers, the resulting composite structure will lack sufficient strength for use as a vehicle frame component. To overcome this difficulty, the fibers are first pre-treated with a wetting agent which facilitates the adhesion of the molten metal to the fibers. Preferably, the wetting agent includes potassium and fluorine. In a pultrusion process, the pre-treated fibers are pulled through a supply of the molten metal to coat the fibers. Then the metal-coated fibers are pulled through a shaping die to form an elongated structure having a desired shape, and cooled to solidify the structure. The elongated structure is cut to a desired length to form a composite vehicle frame component such as a vehicle side rail. Other uses for the composite vehicle frame component include cross members, body sills, bumper beams, and the like.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

The present invention relates to a method of manufacturing a composite structural component for a vehicle. The composite structural component comprises a binding matrix of metal reinforced by a plurality continuous high-strength fibers. Preferred reinforcing fibers include carbon fibers, glass fibers and ceramic fibers. The carbon fibers are particularly preferred, and include both graphitic and nongraphitic forms of carbon. Carbon fibers having a modulus of rigidity within a range of from about 30,000,000 to about 50,000,000 are preferred for increasing the stiffness of the composite structural component. The fibers are usually incorporated into the composite structural component as continuous fiber bundles or tows containing a plurality of fibers, e.g., hundreds or thousands of fibers. However, the fibers can also be incorporated as a plurality of individual continuous fibers.

As discussed above, the molten metal used to form the matrix of the composite structural component does not readily adhere to the reinforcing fibers. To overcome this difficulty, the fibers are first pre-treated with a wetting agent which facilitates the adhesion of the molten metal to the fibers. Preferably, the wetting agent includes potassium and fluorine. For example, the fibers may be pre-treated by forming a chemical film comprising potassium and fluorine on the fibers, or by coating a flux comprising potassium and fluorine on the fibers. The chemical film may be a potassium pentafluoro aluminate film formed by immersing the fibers in an aqueous solution of potassium hydrogen fluoride, a mixed aqueous solution of potassium fluoride and hydrogen fluoride, or a mixed aqueous solution of potassium hydroxide and hydrogen fluoride. The flux may, for example, be a potassium tetrafluoro aluminate flux which is coated on the fibers in a powder form or a suspension form.

Figure 1:
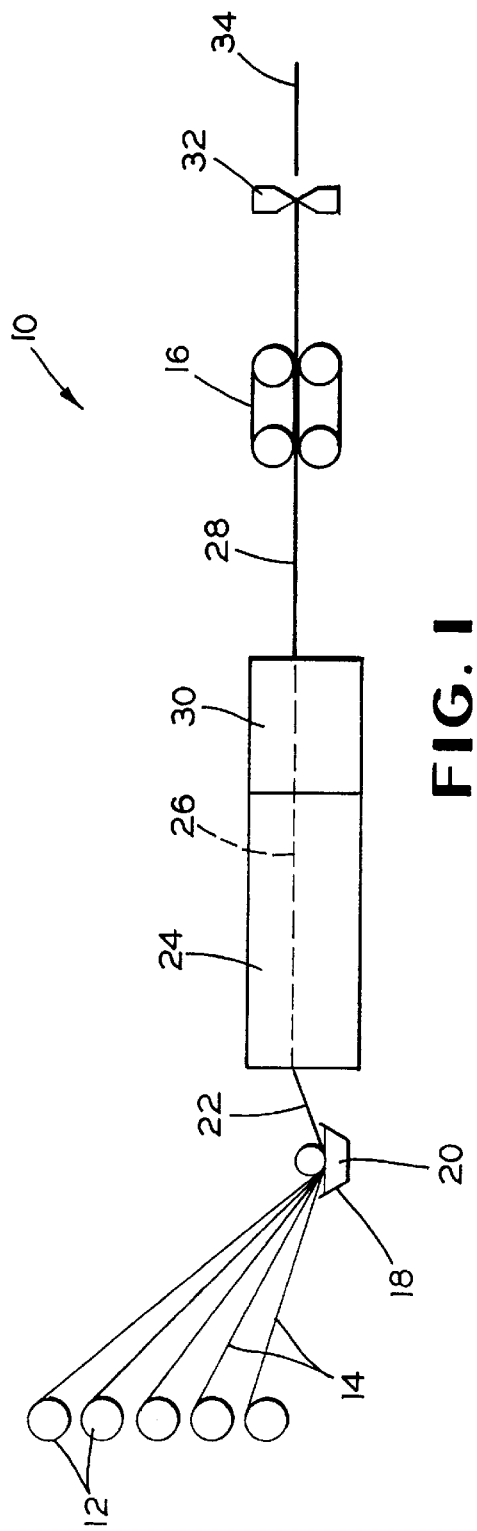
FIG. 1 is a side elevational view of a pultrusion apparatus for manufacturing a composite structural component in accordance with the invention.

The pre-treated fibers are subjected to a pultrusion process to form the composite structural component. Referring now to the drawings, there is illustrated in FIG. 1 a pultrusion apparatus 10 for use in the invention. The apparatus 10 includes a plurality of fiber supply spools 12 for supplying bundles of continuous fibers 14 which have been pre-treated with the wetting agent. The apparatus 10 also includes a pulling mechanism 16 for continuously pulling the fibers 14 from the supply spools 12.

The pre-treated fibers 14 are pulled through a bath 18 of molten metal 20. The wetting agent facilitates the adhesion of the molten metal 20 to the fibers 14 so that the fibers 14 are substantially completely coated with the metal 20. The molten metal 20 forms a relatively thick coating on the fibers 14. Preferred lightweight metals for use in the composite structural component include aluminum, magnesium and their alloys. The aluminum alloys may comprise aluminum and at least one of magnesium, silicon, copper, manganese, zinc, titanium, chromium and zirconium.

The metal-coated fibers 22 are pulled through a shaping die 24. The fibers 22 are disposed in a substantially side-by-side parallel relationship as they are pulled through the shaping die 24. The shaping die 24 shapes the metal-coated fibers 22 to form an elongated composite structure 26 having a desired cross-sectional shape. For example, when the composite structure is used as a side rail in a vehicle frame assembly, the cross-sectional shape of the structure may be box-shaped, C-shaped or I-shaped.

The metal-coated fibers formed into the desired shape are cooled to harden the molten metal and form a solid elongated structure 28 having the desired shape. In the illustrated embodiment, the metal-coated fibers are cooled in a cooling die 30 positioned adjacent to the shaping die 24. However, any other suitable means may be used to cool the metal-coated fibers. For example, the shaping die may include a cooling mechanism to cool the shaped structure. Alternatively, a series of progressively cooler dies (not shown) may be used to cool the shaped structure.

The solid elongated structure 28 is then cut to a desired length by a cutting mechanism 32 to form a composite structural component 34 for a vehicle. The composite structural component 34 comprises a binding matrix of lightweight metal reinforced by a plurality of internal, continuous high-strength fibers integrally bonded within and to the metal matrix. The continuous reinforcing fibers extend longitudinally within the composite structural component, in a generally parallel, spaced apart relationship. The reinforcing fibers impart high strength and stiffness to the metal matrix. The carbon fibers in particular improve the stiffness of the composite structural component. Preferably, the composite structural component has a stiffness modulus within a range of from about 25,000,000 to about 45,000,000.

The pultrusion process is an efficient method of forming the elongated composite structural component. The combination of the pultrusion process and the use of the wetting agent produces a composite structural component in which the metal matrix strongly adheres to the reinforcing fibers.

The composite structural component is preferably adapted for use in a vehicle frame assembly. For example, the composite structural component may be used as a side rail in a vehicle frame assembly. The composite side rail has sufficient strength for use in a heavy truck or other heavy vehicle. In other embodiments of the invention, the composite structural component may be used as a cross member, a supporting structure or a mounting structure in a vehicle frame assembly. In another embodiment, the composite structural component may be used as a vehicle drive shaft.

Figure 2:
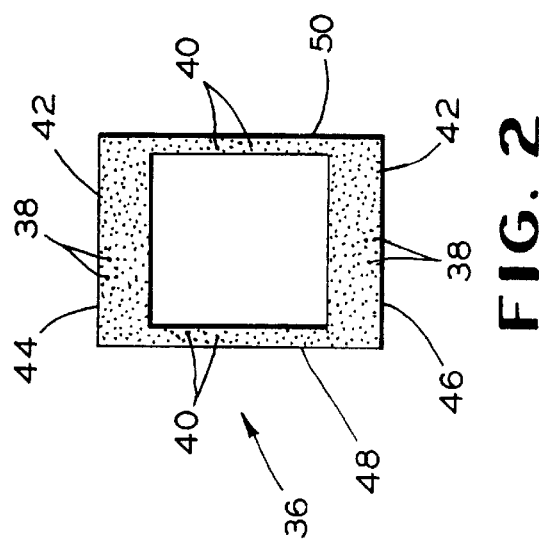
FIG. 2 is a cross-sectional view of a composite side rail for a vehicle frame assembly manufactured in accordance with the invention.

FIG. 2 illustrates a box-shaped composite side rail 36 for a vehicle frame assembly manufactured in accordance with the invention. The side rail 36 is formed from separate bundles of carbon fibers 38 and glass fibers 40 which are pre-treated with a wetting agent, coated with aluminum alloy 42, and pulled through a shaping die to form the box-shaped cross section. The side rail 36 includes a first pair of opposed sides 44 and 46 comprising aluminum alloy 42 reinforced by carbon fibers 38, and a second pair of opposed sides 48 and 50 comprising aluminum alloy 42 reinforced by glass fibers 40.

The relative proportions of reinforcing fibers and metal matrix in the composite structural component can be varied depending on the use of the structural component and the types of fibers and metal. In the composite side rail 36 shown in FIG. 2, the volume percent of carbon fibers 38 and glass fibers 40 in the structural component is preferably from about 25% to about 50%, and the volume percent of aluminum alloy matrix 42 in the structural component is preferably from about 75% to about 50%, respectively.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a frame assembly for a vehicle comprising the steps of:
   (a) providing a first composite structural component by pre-treating a plurality of fibers with a wetting agent, pulling said pre-treated fibers through a supply of molten metal to coat said fibers, wherein said wetting agent facilitates adhesion of said molten metal to said fibers, pulling said coated fibers through a die to form an elongated structure having a desired shape, cooling said elongated structure to solidify said elongated structure, and cutting said elongated structure to a desired length to form a composite structural component,
   (b) providing second, third, and fourth components, and
   (c) assembling said first composite structural component with said second, third, and fourth components to manufacture a frame assembly for a vehicle.

2. The method defined in claim 1 wherein said wetting agent includes potassium and fluorine.

3. The method defined in claim 1 wherein said molten metal is selected from the group consisting of aluminum, aluminum alloys, magnesium and magnesium alloys.

4. The method defined in claim 1 wherein said fibers are selected from the group consisting of carbon fibers and glass fibers.

5. The method defined in claim 2 wherein said fibers are carbon fibers and said molten metal is aluminum alloy.

6. The method defined in claim 1 wherein said fibers are carbon fibers having a modulus of rigidity within a range of from about 30,000,000 to about 50,000,000.

7. A method of manufacturing a vehicle frame assembly comprising the steps of:
   (a) providing a first composite structural component by pre-treating a plurality of fibers with a wetting agent, pulling said pre-treated fibers through a supply of molten metal to coat said fibers, wherein said wetting agent facilitates adhesion of said molten metal to said fibers, pulling said coated fibers through a die to form an elongated structure, cooling said elongated structure to solidify said elongated structure, and cutting said elongated structure to a desired length to form a composite structural component for a vehicle frame assembly,
   (b) providing second, third, and fourth components, and
   (c) assembling said first composite structural component with said second, third, and fourth components to manufacture a vehicle frame assembly.

8. The method defined in claim 7 wherein said wetting agent includes potassium and fluorine.

9. The method defined in claim 7 wherein said molten metal is selected from the group consisting of aluminum, aluminum alloys, magnesium and magnesium alloys.

10. The method defined in claim 7 wherein said fibers are selected from the group consisting of carbon fibers and glass fibers.

11. The method defined in claim 8 wherein said fibers are carbon fibers and said molten metal is aluminum alloy.

12. The method defined in claim 7 wherein said composite structural component comprises from about 75% to about 50% volume percent metal matrix and from about 25% to about 50% volume percent fibers, respectively.

13. The method defined in claim 7 wherein said composite structural component has a stiffness modulus within a range of from about 25,000,000 to about 45,000,000.

14. The method defined in claim 7 wherein said composite structural component is a vehicle side rail.

15. A method of manufacturing a vehicle frame assembly comprising the steps of:
   (a) providing a first composite structural component by pre-treating a plurality of fibers with a wetting agent which includes potassium and fluorine, pulling said pre-treated fibers through a supply of molten metal to coat said fibers, wherein said wetting agent facilitates adhesion of said molten metal to said fibers, and wherein said molten metal is selected from the group consisting of aluminum, aluminum alloys, magnesium and magnesium alloys, pulling said coated fibers through a die to form an elongated structure, cooling said elongated structure to solidify said elongated structure, and cutting said elongated structure to a desired length to form a composite side rail,
   (b) providing second, third, and fourth components, and
   (c) assembling said first composite structural component with said second, third, and fourth components to manufacture a vehicle frame assembly.

16. The method defined in claim 15 wherein said fibers are carbon fibers.

17. The method defined in claim 15 wherein said molten metal is an aluminum alloy.

18. The method defined in claim 15 wherein said composite side rail comprises from about 75% to about 50% volume percent metal matrix and from about 25% to about 50% volume percent fibers, respectively.

19. The method defined in claim 15 wherein said coated fibers are formed in said die into an elongated structure having a box-shaped cross section.

20. The method defined in claim 19 wherein said fibers are separate tows of carbon fibers and glass fibers, and wherein said box-shaped cross section includes a first pair of opposed sides formed of carbon fibers and a second pair of opposed sides formed of glass fibers.

* * * * *